United States Patent [19]

Moireau

[11] Patent Number: 5,985,447
[45] Date of Patent: Nov. 16, 1999

[54] METHOD OF PRODUCING SIZED GLASS STRANDS AND THE RESULTING PRODUCTS

[75] Inventor: Patrick Moireau, Curienne, France

[73] Assignee: Vetrotex France, Chambery, France

[21] Appl. No.: 08/782,298

[22] Filed: Jan. 15, 1997

Related U.S. Application Data

[62] Division of application No. 08/354,823, Dec. 8, 1994, Pat. No. 5,611,836.

[30] Foreign Application Priority Data

Dec. 9, 1993 [FR] France ................................ 93 14792

[51] Int. Cl.$^6$ ................................ D02G 3/00; B32B 9/00
[52] U.S. Cl. ........................ 428/392; 428/375; 428/391; 522/31; 522/42; 528/481; 528/524
[58] Field of Search ..................... 428/392, 391, 428/375; 65/453, 443, 447, 448, 450; 156/176, 178; 264/211.12, 174; 427/508, 512, 513, 553; 522/31, 42; 528/481, 524

[56] References Cited

U.S. PATENT DOCUMENTS

| | | |
|---|---|---|
| 4,099,837 | 7/1978 | Vazirani . |
| 4,530,860 | 7/1985 | Johnson . |
| 4,604,325 | 8/1986 | Pollet et al. . |
| 5,011,523 | 4/1991 | Roncato et al. . |
| 5,049,407 | 9/1991 | Soszka et al. . |
| 5,171,634 | 12/1992 | Soszka et al. . |
| 5,352,392 | 10/1994 | Johnson et al. . |
| 5,486,416 | 1/1996 | Johnson et al. . |
| 5,601,882 | 2/1997 | Augier et al. . |
| 5,611,836 | 3/1997 | Moireau . |

FOREIGN PATENT DOCUMENTS 2274120   7/1994   United Kingdom .

*Primary Examiner*—Pamela R. Schwartz
*Assistant Examiner*—J. M. Gray
*Attorney, Agent, or Firm*—Oblon, Spivak, McClelland, Maier & Neustadt, P.C.

[57] ABSTRACT

A method of producing glass strands, the method comprising coating glass strands with a heat-polymerizable composition constituted by a solution with a solvent content of less than 5% by weight and a viscosity of less than 400 cP, the solution comprising a basic structure which can be polymerized or cross-linked thermally, the structure comprising at least 60% by weight of one or more components with molecular weights of less than 750, having at least one acrylic and/or methacrylic and/or vinyl ether and/or N-vinylamide and/or N-vinyllactam function, the proportion of polyfunctional components within these components being at least 45% by weight of these components, so as to produce glass strands coated with a non-polymerized, heat-polymerizable composition; the glass strands produced, as well as to composites produced from the strands.

9 Claims, No Drawings

METHOD OF PRODUCING SIZED GLASS STRANDS AND THE RESULTING PRODUCTS

This is a Division, of application Ser. No. 08/354,823 filed on Dec. 8, 1994 now U.S. Pat. No. 5,611,836.

BACKGROUND OF THE INVENTION

1. Field of the Invention

The present invention relates to a method of producing and treating glass strands which are intended, in particular, for reinforcing organic substrates, the glass strands being coated with an essentially organic sizing composition which can be polymerized under the action of heat. The present invention also relates to the glass strands produced according to this method and to the composites produced from the strands.

2. Discussion of the Background

The direct manufacture of glass strands is carried out in known manner from threads (or "thin streams") of molten glass which flow from the holes in one or more dies. The threads are drawn mechanically to form continuous filaments and the filaments are then assembled into one or more basic strands, the strands then being collected on moving supports or undergoing other treatments before collection, according to the required applications.

Before they are assembled in the form of strands, the filaments are coated with a sizing composition by passing over a continuously-supplied sizing member. This deposition of sizing composition is necessary for the production of the strands and enables the strands to be associated with other substances, such as organic substrates, to produce composites.

Indeed, in the first place, the sizing composition acts as a lubricant and protects the strands from abrasion resulting from friction of the strands on various members such as guide members, at high speed, during the process mentioned above.

In most cases, the sizing composition also ensures the integrity of the aforementioned strands, that is, the bonding together of the filaments of which they are constituted. This integrity is required particularly in textile applications where the strands are subject to large mechanical stresses. Indeed, if the filaments constituting the strands are not bound to one another, they break more easily in the course of such applications and clog the textile machines. In general, integrity of the strands is required, strands without integrity being considered difficult to handle and, in particular, difficult to extract from windings manually or by means of machines.

The sizing composition also enables the strands to be associated with various substrates to be reinforced in order to produce composite elements, by helping to create bonds between the strands and the substrates to be reinforced and facilitating the wetting of the strands by the substrate. The wetting of the strands means the spreading of the substrate on the surface of the strand, but also its penetration into the interior of the strand which is composed of filaments. The mechanical properties of the composites produced from the substrate and the strands depend, in particular, upon the quality of the adhesion of the substrate to the strands and the capacity of the strands to be wetted by the substrate. The wettability characteristics conflict, however, with the characteristics of integrity mentioned above. In fact, the greater the integrity of a strand, the stronger is the bonding of the filaments to one another and the more difficult it is for the substrate to be reinforced, to penetrate the interior of the strand. In fact, existing sizing compositions are generally the result of a compromise between the capacity to reinforce other substrates and the integrity required in the strands.

In order to be suitable for the methods used, the sizing composition must, in particular, be stable and compatible with the drawing speeds of the filaments which have to pass through it. The sizing composition should not be the source of excessive shearing phenomena due to high speeds of the filaments (which are drawn at a speed of several tens of meters per second) and should not pose problems in wetting the surfaces of the filaments at the speeds used. In methods which make use of steps for the heat treatment of the sizing composition, it is convenient, moreover, to use sizing compositions which react thermally and have a high enough reaction temperature to remain stable under the die.

Although the selection of the method involves the use of a sizing composition which responds to certain conditions, the selection of the sizing composition may also influence the method.

Thus, most sizing compositions used at the moment, are aqueous sizing compositions which are easy to use but which comprise large quantities of water (90% by weight of the sizing composition, leading, in particular, to windings having from 8 to 14% by weight of water) which necessitates the provision of a step for drying the strands before any use of the strands for reinforcing organic substrates since the water may detract from the good adhesion between the strands and the substrates. These drying steps are long and costly. When they are carried out during the drawing operation (that is, before the collection of the strands obtained after the assembly of the filaments) either at the level of the filaments (WO 92/05122) or at the level of the strands (U.S. Pat. No. 3,853,605), they necessitate the installation of drying devices under each die and, when they are carried out on windings of strands, they involve the risk of migration of the sizing composition into the interior of the windings. These migrations occur in a more or less selective manner according to the affinity of the sizing components for glass and they lead to the production of strands having characteristics which are not uniform along their lengths. Aqueous sizing compositions are moreover distributed unevenly on the strands from their deposition, due to their nature. In addition to these migration phenomena, in certain cases, there are phenomena of coloration of the strands or deformation of the windings. Moreover, the effectiveness of the drying steps is not always optimal, these drying steps having to be adapted to the various manufacturing conditions and depending on the composition of the sizing composition, the weight of the strands to be dried, etc. . .

A few patents propose solutions for reducing the drying and/or migration problems with the use of non-aqueous sizing compositions but the sizing compositions in question generally make use of organic solvents which are difficult to handle and may be harmful to the health of people in the vicinity because they are toxic and/or may pose problems of viscosity which can conveniently be solved by heating the sizing compositions (U.S. Pat. No. 4,604,325) or by adding suitable agents (U.S. Pat. No. 4,609,591). The use of these sizing compositions in many cases also necessitates the installation of certain devices below each die; in particular, it is necessary, when the strands coated with the sizing compositions are collected in the form of a winding, to treat the strands before producing the finished winding to prevent excessive bonding between the strands, since this bonding makes it difficult to unwind the strands. The treatments consist, for example, of heating the layer of continuous filaments coated with the sizing composition so as to eliminate the solvent of the sizing composition before assembling the filaments (U.S. Pat. No. 3,425,862) or polymerizing the sizing composition by subjecting the strand to the action of ultraviolet rays over at least a portion of its travel (U.S. Pat. No. 5,049,407). The effectiveness of these treatments depends, once again, on the operating conditions.

SUMMARY OF THE INVENTION

The subject of the present invention is a method of producing and treating sized glass strands in which the strands are produced directly and are then collected, the sized strand not requiring special treatment (including polymerization), or the use of supplementary devices from the step for the deposition of the sizing composition to the collection of the sized strands, these two steps being included, and which also does not require treatment such as drying before polymerization.

Another subject of the invention is a method of producing and treating sized glass strands, the sizing composition used being sufficiently stable, protecting the strands effectively from abrasion, and conferring on the strands a better capacity to be wetted by the substrates to be reinforced, the sized strands also being easy to handle, having uniform characteristics throughout their length and being usable advantageously to manufacture composites having improved mechanical characteristics.

A further subject of the invention relates to the strands produced by the method of the invention as well as to composites reinforced with the aid of these strands.

The objects of the invention are achieved by a method of producing and treating sized glass strands according to which a plurality of threads of molten glass flowing from a plurality of holes disposed at the base of one or more dies is drawn to form one or more fans of continuous filaments, the filaments then being assembled into one or more strands which are collected on a moving support, the method consisting of the deposition of a heat polymerizable sizing composition on the surface of the filaments, during the drawing and before the filaments are assembled into strands, the sizing composition being constituted by a solution with a solvent content of less than 5% by weight and a viscosity less than or equal to 400 cP, the solution comprising a basic structure which can be polymerized and/or cross linked thermally, the structure comprising at least 60% by weight of one or more components with molecular weights (Mw) of less than 750, having at least one of an acrylic, a methacrylic, a vinyl ether, an N-vinylamide, or an N-vinyllactam functional group, the proportion of polyfunctional component(s) within these components being at least 45% by weight of these components, so as to produce glass strands coated with a non-polymerized, heat-polymerizable sizing composition.

The strands produced after the assembly of the filaments according to this method are preferably collected in the form of a winding on a rotating support.

DETAILED DESCRIPTION OF THE PREFERRED EMBODIMENTS

"Heat-polymerizable sizing composition" is intended to mean, according to the invention, that at least some of the components of the sizing composition can undergo polymerization and/or cross linking to a greater or lesser extent during heat treatment.

"Glass strands coated with a non-polymerized sizing composition" is intended to mean glass strands coated with the sizing composition defined in the preceding paragraph, as opposed to the "glass strands coated with polymerized sizing composition" which are produced after polymerization and/or cross-linking heat treatment.

In the sizing composition deposited according to the invention, the solvents may be the organic solvents which are necessary to dissolve certain compounds which can be polymerized and/or cross-linked, or water which is normally introduced indirectly by means of hydrated or hydrolysed constituents. The amount of solvent is less than 5%, preferably less than 3%, more preferably less than 1%. The presence of these solvents in limited quantity does not require special treatments in order to eliminate them. In most cases, the sizing compositions according to the invention are completely free of solvent.

Owing to its low viscosity, the sizing composition is compatible with the conditions for producing glass strands imposed by the direct method, that is, it can be used in a satisfactory manner whatever the drawing speed of the filaments passed through it (several tens of meters per second) or the diameter of the filaments (generally between 5 and 24 μm). The sizing composition according to the invention also has a strand-wetting speed compatible with the drawing speed of the strands.

"Basic structure" (or "basic system") according to the invention, is intended to mean sizing compounds having the function essentially of participating in the structure of the sizing composition. The basic structure preferably represents at least 70% by weight of the sizing composition according to the invention and, particularly preferably, represents between 80 and 100% by weight of the sizing composition.

Preferably, and in most cases according to the invention, the component or components with molecular weights (Mw) of less than 750 which are present in the basic structure of the sizing composition according to the invention and have at least one of the functional groups mentioned in the definition of the invention have molecular weights (Mw) of less than 500. Similarly, in most cases according to the invention and particularly preferably, this component or these components are (mono- or polyfunctional) monomers. The basic structure comprises at least 60% by weight of the components with molecular weights (Mw) of less than 750 mentioned above and, preferably, comprises at least 70% by weight of these components.

Advantageously, the basic structure comprises at least 60% by weight of a mixture of components with molecular weights (Mw) of less than 750, a mixture of these components being, in particular, more reactive than only one of these components. Each component of the mixture has one functional group (a monofunctional component), or a plurality of identical (polyfunctional components) or different functional groups selected from those mentioned in the definition of the invention, that is acrylic, methacrylic, vinyl ether, N-vinylamide and N-vinyllactam. As indicated in the definition of the invention, the proportion of polyfunctional component(s) within the group formed by the component or components with molecular weights (Mw) of less than 750 of the basic structure is greater than or equal to 45% by weight of the group and, preferably, is greater than or equal to 50% by weight of the group so as, in particular, to confer sufficient reactivity on the basic structure and to enable it to form bi- or tri-directional lattices during polymerization. The proportion of polyfunctional component(s) within the basic structure is also advantageously greater than or equal to 45%, and preferably 50%, by weight of the structure, whatever the molecular weight (Mw) of the component or components.

All of the components of the basic structure can be prepared by conventional techniques known to those of ordinary skill in the art.

The acrylic or methacrylic components with molecular weights (Mw) of less than 750 according to the invention may be monomers such as $C_{1-30}$ aliphatic acrylates or methacrylates, $C_{6-50}$ aromatic acrylates or methacrylates, acrylates or methacrylates carrying halogenated substitutions (the halogens in question may be fluorine, chlorine, or bromine) or acrylate or methacrylate derivatives such as acrylamide or methacrylamide derivatives.

By way of example, the monofunctional acrylic or methacrylic monomers according to the invention may, in particular be $C_{1-30}$ aliphatic acrylates or methacrylates such as cyclohexyl-, n-hexyl, isodecyl-, stearyl-, lauryl, octyl-, isobornyl-acrylates or methacrylates, $C_{6-50}$ aromatic acrylates or methacrylates such as 2-phenoxy ethyl-, benzyl-, acrylates or methacrylates, or even alkyl, tetrahydrofuryl-, 2 ethoxyethyl, 2-methoxyethyl-, 2(2-ethoxy ethoxy)ethyl-, glycidyl-, 2 hydroxyethyl carbamate of isopropyl-, n-butyl, 2 hydroxyethyl carbamate, 2 hydroxyethyl oxazolidone-, acrylates or methacrylates, fluoroalkyl acrylates or acrylamide or methacrylamide derivatives optionally N-substituted by alkyl, alkoxyalkyl, or hydroxyalkyl groups, such as N,N'-dimethylacrylamides N-isobutylacrylamides, N-methylolacrylamides, N-methoxymethylacrylamides, N-butoxymethylacrylamides, diacetoneacrylamides, these monofunctional monomers serving, in particular, to give the sizing composition the required fluidity.

The polyfunctional acrylic or methacrylic monomers according to the invention may, in particular, consist of triethylene glycol-, ethylene glycol-, tetraethylene glycol-, 200 to 600 polyethylene glycol-, 1,3 butylene glycol-, 1,4 butanediol-, diethylene glycol-, 1,6-hexanediol-, neopentyl glycol-, ethoxylated bisphenol A, diethylcarbonate-, diacrylates or dimethacrylates, alkoxylated or non-alkoxylated diacrylate or dimethacrylate diols with $C_{14}$–$C_{19}$ aliphatic chains, tris (2-hydroxyethylisocyanate)-, pentaerythrytol-, trimethylolpropane-, triacrylates or trimethacrylates, pentaerythrytol-, ditrimethylol-propane-, tetracrylates or tetramethacrylates, dipentaerythrytol-, pentaacrylates or pentamethacrylates, tetrabromobisphenol A diacrylates, ethylene glycol bis (N-methylol acrylamide).

The monofunctional vinyl ether monomers according to the invention may consist of butanediol monovinyl ethers, isobutylvinyl ethers, triethylene glycol monovinyl ethers, octadecyl vinyl ethers, hydro-$C_{1-30}$-alkyl vinyl ethers, urethane $C_{1-30}$ alkylvinyl ethers, urethanephenyl vinyl ethers, and the monofunctional N-vinylamide and/or N-vinyllactam monomers may consist of N-vinyl 2-pyrrolidones, N-vinylcaprolactams, N-vinylpiperidones, N-vinyloxazolidones, N-methyl N-vinylformamides, N-vinylmorpholinones, N-vinyl-succinimides, or N-vinylcarbazoles.

The polyfunctional vinyl ether, N-vinylamide or N-vinyllactam monomers may, in particular, comprise triethylene glycol divinyl ethers, diethylene glycol divinyl ether, 1,4-cyclohexane dimethanol divinyl ethers, etc.

In addition to the monomers mentioned above, the basic structure of the sizing composition may comprise other compounds which can be polymerized and/or cross-linked thermally, such as polymers and/or copolymers with partially polymerized functions having reactive functional groups similar to those of the monomers used, these polymers and/or copolymers generally having molecular weights (Mw) greater than 750. In particular, when the sizing composition used in the method according to the invention comprises acrylic or methacrylic monomers, these sizing composition may also comprise polymers and/or copolymers with acrylic and/or methacrylic functions, these functions being partially polymerized. In particular, these polymers or copolymers may be acrylate or methacrylate resins on a base identical to that of the monomers used, such as an $C_{1-30}$ aliphatic or $C_{6-50}$ aromatic urethane base, an $C_{1-30}$ aliphatic and/or $C_{6-50}$ aromatic epoxy base, an $C_{1-30}$ aliphatic and/or $C_{6-50}$ aromatic base, a silicon base, a fatty-acid ester or polyester base, or a silicone urethane base, the resins used possibly having halogenated substitutions. Similarly, the polymers and/or copolymers used may have vinyl ether and/or N-vinylamide and/or N-vinyllactam functions, these functions being partially polymerized. According to one embodiment of the invention, the basic structure thus comprises at least one component with a molecular weight (Mw) greater than 750, this component being, for example, in the form of a polymer or copolymer as mentioned above having at least one of an acrylic, a methacrylic, a vinyl ether, an N-vinylamide, or an N-vinyllactam function.

It should be noted that when the sizing composition used in the method according to the invention is deposited on the filaments during drawing, it is distributed very quickly over their entire surface and forms a true protective film for each one. The strand produced according to the method of the invention is thus constituted by a bundle of filaments which can slide over one another, which favors its impregnation by any substance to be reinforced. By virtue of the selection of the components of the sizing composition, of their respective proportions, and of the low viscosity of the assembly, however, none of the constituents present acts as a bonding agent which can confer a certain integrity on the sized strands produced. The strand consequently does not have integrity in the normal sense of the term, that is, it is not constituted by filaments fixed together by virtue of a connection by bonding brought about by one or more constituents of the sizing composition such as the one which can be brought about by film-forming agents when they are present in a large quantity in a sizing composition.

In spite of this, it has been observed that the strands produced according to the invention are easy to handle and when reeled to form windings, can easily be extracted from the windings without having to undergo treatment to polymerize (and/or cross-link) the sizing composition beforehand. Moreover, the strands produced have a better capacity to be wetted by the substances to be reinforced, as explained above.

Although the sizing composition according to the invention is characterized by the absence of bonding agents such as film-forming agents when they are present in large quantities, it may nevertheless comprise, by way of additive (s) to the basic structure, at least one film-forming agent in proportions not exceeding 10% by weight. The proportions are insufficient to confer any integrity on the strand but facilitate the drawing in the method according to the invention, for certain drawing speeds of the filaments and certain diameters of the filaments. The presence of film-forming agents in particular prevents excessive friction of the filaments on the device for depositing the sizing composition when the filaments are very fine and are drawn at great speed. The film-forming agents according to the invention may be capable of being polymerized and/or cross-linked thermally and preferably consist of derivatives of silicones and/or siloxanes such as silicone acrylates, α-ω-hydroxypolydimethyl siloxanes, α-ωaminopolydimethyl siloxanes, or α-ω-acryloxypolydimethyl siloxanes.

It is useful to point out that the additives which may be incorporated in the sizing composition fulfill quite specific functions and, unlike the basic structure, do not participate substantially in the structure of the sizing composition. Although these additives should be distinguished from the basic structure, they may nevertheless be capable of being polymerized and/or cross-linked thermally like the compounds of the basic structure.

The sizing composition according to the invention may also comprise, by way of additive(s), at least one coupling agent, the proportion of coupling agent(s) within the sizing composition being no more than 15% by weight. The coupling agents which may be used are most often not polymerizable by a free radical reaction and may consist of organosilanes which, preferably, have a molecular weight (Mw) of less than 500. As examples of organosilane coupling agents, gamma-aminopropyltriethoxysilanes, methyltrimethoxysilanes, gamma-glycidoxypropyltrimethoxysilanes, N β-(aminoethyl)-gamma-aminopropyltrimethoxysilanes, gamma-isocycanatopropyl triethoxysilanes, or 3-methoxy-5-hydroxy-phenyl-alkyl trimethoxysilanes, may be mentioned, in particular. The coupling agents usable in the invention may also consist of titanates or zirconates, or even siloxanes.

The sizing composition according to the invention may also comprise, by way of additive(s), at least one so-called "textile" agent, which acts essentially as a lubricant, particularly for certain textile applications, the proportion of textile agent being no more than 8% by weight. The textile agents which may be used are preferably fatty esters or glycol esters such as isopropyl palmitates, cetyl palmitates, isobutyl stearates, decyl laurates, or ethylene glycol adipates. The sizing composition may also comprise, by way of additive(s), at least one agent for adaptation to the substrate to be reinforced, particularly in the case of cementitious substrates.

According to the intended purpose of the strand produced according to the invention, the sizing composition used may also comprise, by way of additive(s) one or a plurality of polymerization initiators including at least one organic peroxide and, possibly, one or more catalysts such as cobalt derivatives. In many cases, the organic peroxide or peroxides will be present in the sizing composition and will be present in proportions varying between 0.5 and 4% by weight. In particular, the peroxide or peroxides will be present in the sizing composition when the polymerization of the sizing composition is to be effected directly after the collection of the sized strands and without previous impregnation of the strands with other substrates such as substrates to be reinforced (for example, when the strands are intended for textile applications).

The peroxides according to the invention may, in particular, consist of methylethylketone peroxides, cyclohexanone peroxides, acetylacetone peroxides, dibenzoyl peroxides, bis(4-tert-thiobutyl-cyclohexyl)-peroxydicarbonates, tert-butyl peroxy-2-ethylhexanoates, tert-butyl peroxy-3-3-5-trimethylhexanoates, tert-butylperoxybenzoates, tert-butylperoxyisopropyl carbonates, 1-1 bis(tert-thio-butyl-peroxy)-cyclohexanes, 1-1 bis(tert-thiobutyl-peroxy)-3-3-5-trimethylcyclohexanes, ditertthiobutyl peroxides, bis(tert-butylperoxyisopropyl) benzenes, dicumyl peroxides, or tert-butyl hydroperoxides. These peroxides preferably have a decomposition temperature higher than 60° C.

The peroxide or peroxides, which are often very reactive, may also be accompanied by one or a plurality of stabilizing agents which act as polymerization retarders particularly for preventing the sizing composition from starting to polymerize before the sizing composition has been deposited on the strands and/or before the collection of the sized strands. The sizing composition, in this case, will comprise at most 3% by weight of stabilizing agent(s), which agents may, in particular, be phthalates, paratert-thiobutylcatechols, or 2-6-ditertthiobutylparacresols. Preferably, however, the use of stabilizing agents will be avoided particularly by cooling the strands and/or the systems for depositing the sizing composition on the strands to prevent the sizing composition from being heated owing to the proximity of the die, this heating risking causing the sizing composition to start polymerizing.

The sized strands produced according to the method of the invention may be used in many applications which may or may not require the polymerization (and/or cross-linking) of the sizing composition coating the strands directly after collection and before they are used for these applications. In particular, when the strands are to be subjected to large mechanical stresses during their use, for example, in textile applications, it is preferable, before using them, to polymerize the sizing composition coating them by subjecting the strands produced, which are generally in the form of windings, to a heat treatment independently of the drawing step. The polymerization then confers on the strand sufficient integrity, within the ordinary sense of the term, to withstand these stresses. In this case, the sizing composition used in the method according to the invention preferably comprises the aforementioned polymerization initiator or initiators. In this case also, if the strands produced according to the method of the invention are collected in the form of windings, the quantity of sizing composition deposited on the filaments is such that the strands comprise less than 5% by weight of sizing composition. Indeed, above this upper limit, excessive bonding of the turns of strands to one another within the windings may occur during polymerization, this bonding rendering the strands unusable. Moreover, at the level of the windings of sized glass strands which are produced according to the invention and are subjected to heat treatment before the unreeling of the strands, the turns of the strands constituting the windings must have a cross-over angle of at least 1.5°. The cross-over angle means the angle between the turns of the strands belonging to two consecutive layers, the bisector of which is within a plane perpendicular to the winding axis.

Indeed, during the initial stage of this treatment the temperature rise causes a temporary decrease in the viscosity of the sizing composition before the polymerization (and/or cross-linking) reactions intervene. If the cross-over angle of the winding is zero or very small, the turns of the strand of two consecutive layers of the winding are bonded or are at least in contact over a large portion of their lengths and the sizing composition tends to connect the turns. Upon completion of the heat treatment, the bonding zones between the turns of the strand of consecutive layers are large and the winding is unusable. When the cross-over angle of the strand is at least 1.5°, the bonding zones are considerably reduced and do not prevent the removal of the strand.

The sized strands according to the invention, which may or may not have undergone heat treatment, may also be used in applications other than textile applications. The main application of these strands is for reinforcing various substrates in order to produce composites. These substrates may be mineral (cementitious) but are mostly organic. The glass strands coated with non-polymerized sizing composition or with sizing composition polymerized by heat treatment produced according to the invention may be associated with various organic substrates before the assembly is treated to produce either intermediate products for the production of composites, such as preimpregnated products, or to produce composites directly.

In the case of the use of a strand coated with a non-polymerized sizing composition according to the invention, particularly a strand extracted from a winding produced according to the method of the invention, the strand may be associated directly with an organic substrate without previous polymerization of the sizing composition and the polymerization or cross-linking (or gelling) of the assembly may be effected by subjecting the assembly to heat treatment, the reaction being initiated, at least partially by at least one thermal polymerization initiator and/or catalyst which is in the organic substrate. When the sizing composition according to the invention also contains a polymerization initiator or initiators of which at least one is an organic peroxide, the initiators may also intervene in the initiation of the reaction. The thermal polymerization initiator and/or catalyst present in the matrix must not necessarily, for its part, contain organic peroxide.

In the case of the use of strands coated with a polymerized sizing composition according to the invention, the association of the strands and the organic substrate to be reinforced in order to produce a composite is carried out in a known manner, the assembly subsequently being subjected to a suitable treatment (possibly other than a heat treatment) in order to cure the reinforced substrate.

The method according to the invention thus permits the production of strands coated with a sizing composition which is not polymerized or is polymerized by heat treatment separately from the drawing operation, the sized strands in this case having an ignition loss of less than 5% by weight, the strands being constituted by filaments which are uniformly coated with the sizing composition and which can easily be impregnated with an organic substrate. These strands are particularly suitable for the production of composites to which, in most cases, they confer improved mechanical properties.

Having generally described this invention, a further understanding can be obtained by reference to certain specific examples which are provided herein for purposes of illustration only and are not intended to be limiting unless otherwise specified.

The glass strands described below are formed by the mechanical drawing of molten glass threads flowing from the holes in a die to form filaments of 14 μm diameter. The glass used is an alumino-borosilicate practically free of alkaline oxides, known by the name of E glass. The glass filaments are coated with a sizing composition according to the invention by means of a sizing roller of 40 mm diameter rotating at 110 revolutions/min. The filaments are subsequently assembled to form strands which are reeled on rotating supports so as to obtain windings having a mean cross-over angle of between about 10 and 16°.

EXAMPLE 1

In this example, the filaments were coated with the following sizing composition, expressed as percentages by weight:

Basic Structure:

| Components with molecular weights of less than 750 - monomers: | |
|---|---|
| • 2 (2-ethoxy ethoxy) ethylacrylate[1] | 21% |
| • triethylene glycol divinyl ether[2] | 23% |
| • ethoxylated trimethylolpropanetriacrylate[3] | 20% |
| Components with molecular weights greater than 750: | |
| • acrylate resin on aromatic epoxy base[4] | 20% |
| Polymerization initiator: | |
| • tert-butyl peroxybenzoate[5] | 2% |
| Additives: | |
| • gamma-aminopropyltriethoxysilane coupling agent[6] | 10% |
| • isopropyl palmitate textile agent | 4% |

The sizing composition in question had a viscosity of 40 cP at 37° C. The strands coated with sizing composition were reeled for 1200 s to form rovings having an approximate mass of 7 kg and the rovings were then subjected to a heat treatment at 130° C. for 180 min.

The strands were then extracted from the windings to measure their abrasion resistance. The strands had a linear mass of 330 tex (g/km), their ignition loss rising to 0.75%. The abrasion resistance of the strands extracted from the windings was evaluated by weighing the quantity of fuzz formed after passing the strands over a series of rods. For various strands coated with the polymerized sizing composition described above, the quantity of fuzz, weighed upon completion of the test and expressed in milligrams of fuzz per kilogram of strand tested, varied between 8 and 50 mg/kg.

By way of comparison, strands coated with an aqueous sizing composition based on an emulsion of epoxy resin, silanes and cationic surfactants, these strands being dried according to normal methods, may form from 200 to 500 mg of waste per kg of strand.

Moreover, the strands coated with the polymerized sizing composition according to this example had very good textile qualities.

EXAMPLE 2

In this example, the filaments were coated with the following sizing composition expressed as percentages by weight:

Basic Structure:

| Components with molecular weights of less than 750 - monomers: | |
|---|---|
| • 2 (2-ethoxy ethoxy) ethylacrylate[1] | 23.5% |
| • triethylene glycol divinyl ether[2] | 27% |
| • triacrylate ester[7] | 26% |
| Component with a molecular weight greater than 750: | |
| • aliphatic acrylate urethane oligomer[8] | 7.5% |
| Polymerization initiator: | |
| • tert-butyl peroxybenzoate[5] | 2% |
| Additives: | |
| • gamma-aminopropyltriethoxysilane coupling agent[6] | 10% |
| • isopropyl palmitate textile agent | 4% |

The strands produced were reeled for 3600 s to form rovings having an approximate mass of 20 kg, the rovings then being subjected to heat treatment at 130° C. for 180 min. The strands extracted from the rovings had a linear mass of 474 tex and an ignition loss of 0.97%. After heat treatment of the windings it was found that there was no migration of the sizing composition.

EXAMPLE 3

In this example, the filaments were coated with the following sizing composition expressed as percentages by weight:

Basic Structure:

| Components with molecular weights of less than 750 monomers: | |
|---|---|
| • 2 (2-ethoxy ethoxy) ethylacrylate[1] | 21% |
| • triethylene glycol divinyl ether[2] | 23% |
| • triacrylate ester[7] | 20% |
| Component with a molecular weight greater then 750: | |
| • aliphatic acrylate urethane oligomer[8] | 20% |
| Polymerization initiator: | |
| • tert-butyl peroxybenzoate[5] | 2% |
| Additives: | |
| • gamma-aminopropyltriethoxysilane coupling agent[6] | 10% |
| • isopropyl palmitate textile agent | 4% |

The strands produced were reeled for 3600 s to form rovings having an approximate weight of 20 kg, the rovings then being subjected to heat treatment at 130° C. for 180 min. The strands extracted from the rovings had a linear mass of 335 tex and an ignition loss of 0.86%. After heat treatment of those windings it was found that there was no migration of the sizing composition.

EXAMPLE 4

In this example, the filaments were coated with the following sizing composition expressed as percentage by weight:

Basic Structure:

| Components with molecular weights of less than 750 monomers: | |
|---|---|
| • 2 (2-ethoxy ethoxy) ethylacrylate[1] | 25% |
| • triethylene glycol divinyl ether[2] | 29% |
| • triacrylate ester[7] | 29% |
| Polymerization initiator: | |
| • tert-butyl peroxybenzoate[5] | 3% |
| Additives: | |
| • gamma-aminopropyltriethoxysilane coupling agent[6] | 10% |
| • isopropyl palmitate textile agent | 4% |

The sizing composition in question had a viscosity of 24 cP at 25° C. The strands coated with the sizing composition were reeled for 1200 s to form rovings having 10 an approximate weight of 7 kg the rovings then being subjected to heat treatment at 130° C. for 180 min. The strands extracted from the windings and coated with the polymerized sizing composition had a linear mass of 342 tex, their ignition loss rising to 0.70%.

EXAMPLE 5

In this example, the filaments were coated with the following sizing composition expressed as percentages by weight:

Basic Structure:

| Components with molecular weights of less than 750 monomers: | |
|---|---|
| • 2 (2-ethoxy ethoxy) ethylacrylate[1] | 22% |
| • triethylene glycol divinyl ether[2] | 24% |
| • ethoxylated trimethylolpropanetriacrylate[3] | 20% |
| Component with a molecular weight greater than 750: | |
| • acrylate resin on aromatic epoxy base[4] | 20% |
| Additives: | |
| • gamma-aminopropyltriethoxysilane coupling agent[6] | 10% |
| • isopropyl palmitate textile agent | 4% |

The sizing composition in question had a viscosity of 50 cP at 25° C. The strands coated with the non-polymerized sizing composition had a linear mass of 321 tex and an ignition loss of 0.80%.

EXAMPLE 6

In this example, the filaments were coated with the following sizing composition expressed as percentages by weight;

Basic Structure:

| Components with molecular weights of less than 750 monomers: | |
|---|---|
| • lauryl acrylate[9] | 24% |
| • aliphatic alkoxy diacrylate ester[10] | 21% |
| • triethoxylated trimethylolpropanetriacrylate[3] | 23% |
| • acrylated epoxy bisphenol A[11] | 20% |
| Polymerization initiator: | |
| • di-terbutyl peroxide[12] | 2% |
| Additive | |
| • gamma-glycidoxypropyltrimethoxysilane coupling agent[13] | 10% |

The sizing composition in question had a viscosity of 48 cP. The sized strands were reeled to form rovings having an approximate weight of 13 kg, the rovings then being subjected to heat treatment at 130° C. for 5 hours followed by heat treatment at 140° C. for 4 hours. The strands extracted from the windings and coated with polymerized sizing composition had a linear mass of 332 tex, their ignition loss rising to 0.74% by weight.

The abrasion resistance of the strands was evaluated in Example 1. The quantity of fuzz weighed upon completion of the test was of the order of 57 mg of fuzz per kg of strand.

EXAMPLE 7

In this example, the filaments were coated with the following sizing composition expressed as percentages by weight:

Basic Structure:

| Components with molecular weights of less than 750 monomers: | |
|---|---|
| • tripropylene glycol diacrylate[14] | 25% |
| • dipropoxylated neopentyl glycol diacrylate[15] | 21% |
| • triethoxylated trimethylolpropanetriacrylate[3] | 23% |

| Component with a molecular weight greater than 750: | |
|---|---|
| • acrylate epoxy resin on bisphenol A[16] | 13% |
| Polymerization Initiator: | |
| • tert-butyl and cumyl peroxide[17] | 2% |
| Additives: | |
| • gamma-glycidoxypropyltrimethoxysilane coupling agent[13] | 10% |
| • isopropyl palmitate textile agent | 6% |

The sizing composition in question had a viscosity of 60 cP. The sized strands were reeled to form rovings having an approximate weight 13 kg, the rovings then being subjected to heat treatment at 140° C. for 8 hours. The strands extracted from the windings and coated with polymerized sizing composition had a linear mass of 325 tex, their ignition loss rising to 0.66% by weight.

EXAMPLE 8

In this example, the filaments were coated with the following sizing composition expressed as percentages by weight:
Basic Structure:

| Components with molecular weights of less than 750 - monomers: | |
|---|---|
| • dipropoxylated neopentyl glycol diacrylate[15] | 31% |
| • tripropylene glycol diacrylate[14] | 32% |
| Component with a molecular weight greater than 750: | |
| • aromatic polyurethane acrylate oligomer[18] | 25% |
| Polymerization initiator | |
| • tert-butyl and cumyl peroxide[17] | 2% |
| Additive: | |
| • gamma-glycidoxypropyltrimethoxysilane coupling agent[13] | 10% |

The sizing composition in question had a viscosity of 78 cP. The sized strands were reeled to form rovings having an approximate weight of 13 kg, the rovings then being subjected to heat treatment at 160° C. for 8 hours. The strands extracted from the windings and coated with the polymerized sizing composition had a linear mass of 320 tex, their ignition loss rising to 0.54% by weight.

The abrasion resistance of the strands was evaluated as in Example 1. The quantity of fuzz weighed upon completion of the test was of the order of 41 mg of fuzz per kg of strand.

EXAMPLE 9

In this example, the filaments were coated with the following sizing composition expressed as percentages by weight:
Basic Structure:

| Composition with molecular weights of less than 750 - monomers: | |
|---|---|
| • triacrylate ester[7] | 28% |
| • 2 (2-ethoxy ethoxy) ethylacrylate[1] | 30% |
| • hexanediol diacrylate[19] | 25% |
| Additives: | |
| • gamma-glycidoxypropyltrimethoxysilane coupling agent[13] | 12% |
| • isopropyl palmitate textile agent | 5% |

The sized strands were not subjected to a thermal polymerization treatment.

COMPARATIVE EXAMPLES

The mechanical characteristics of the composites produced with the aid of the strands coated with polymerized sizing compositions according to Examples 1 and 4 or produced with the aid of strands coated with non-polymerized composition according to Example 5 were compared with the mechanical characteristics of the composites produced with the aid of reference strands coated with an aqueous sizing composition based on an emulsion of epoxy resin, silanes and cationic surfactants.

In order to measure these characteristics, plaques with parallel strand were formed from the various strands, respectively, in accordance with the standard NF 57152. The resin used was epoxy resin CY 205 marketed under this reference by the company CIBA-GEIGY, to which was added 21.5% by weight of an aminated hardener, serving as a copolymerization agent, also marked by the company CIBA-GEIGY under the reference HT 972.

The mechanical bending and shear characteristics of these plaques were measured according to the standards ISO 178 and ISO 4585, respectively. These characteristics were measured before aging and after the immersion of the plaques in water at 98° C. for 72 h.

The results obtained over 8 to 10 tests for each type of strand with plaques having identical quantities of glass by weight were as follows:

| | Ex. 1 | Ex. 4 | Ex. 5 | Reference |
|---|---|---|---|---|
| Bending Stress at breaking point (MPa) | | | | |
| before aging | 2376 | 2369 | 2488 | 2280 |
| | σ (75) | σ (50) | (47) | (40) |
| after aging | 1563 | 1635 | 1637 | 1400 |
| | σ (73) | (24) | (27) | (20) |
| Shear stress at breaking point (MPa) | | | | |
| before aging | 64.0 | 67.2 | 74.5 | 69.5 |
| | σ (1.4) | (0.8) | (1.0) | (1.0) |
| after aging | 32.2 | 43.3 | 50.4 | 40.0 |
| | σ (1.0) | (1.2) | (1.1) | (0.4) |

The Figures in brackets indicate the standard deviation for each series of measurements.

These results show that composite specimens formed from strands produced according to the invention have characteristics which are as good as and, for at least one of these characteristics, better than the specimens manufactured from conventional strands. The results obtained in the case of the specimens produced from strands coated with non-polymerized sizing composition according to Example 5 were particularly good, the composites produced having mechanical characteristics better than those of the composites produced from conventional stands both in bending and in shear.

The strands produced according to the invention may thus advantageously be used in applications of numerous types either for textile applications or for the reinforcement of mineral matrices (reinforcing meshes for bitumen, for example) or organic matrices.

References:
(1) Marketed under the reference Sr 256" by the CRAY-VALLEY company
(2) Marketed under the reference "DVE 3" by the INTERNATIONAL SPECIALITY PRODUCTS company
(3) Marketed under the reference "SR 454" by the CRAY-VALLEY company
(4) Marketed under the reference "Photomer 3016" by the AKCROS company
(5) Marketed under the reference "Trigonox C" by the Akzo company
(6) Marketed under the reference "A 1100" by the UNION CARBIDE company
(7) Marketed under the reference "Photomer 4171" by the AKCROS company
(8) Marketed under the reference "Actilane 27" by the AKCROS company
(9) Marketed under the reference "SR 335" by the CRAY-VALLEY company
(10) Marketed under the reference "SR 9209" by the CRAY-VALLEY company
(11) Marketed under the reference "Ebecryl 3605" by the UNION CHIMIQUE BELGE company
(12) Marketed under the reference "Trigonox" B" by the AKZO company
(13) Marketed under the reference "Silane A 187" by the company OSI SPECIALITICS S.A.
(14) Marketed under the reference "TPGDA" by the company UNION CHIMIQUE BELGE
(15) Marketed under the reference "SR 9003" by the CRAY-VALLEY company
(16) Marketed under the reference "CN 104" by the CRAY-VALLEY company
(17) Marketed under the reference "Trigonox T" by the AKZO company
(18) Marketed under the reference "Actilane 17" by the AKCROS company
(19) Marketed under the reference "HDDA" by the company UNION CHIMIQUE BELGE Obviously, numerous modifications and variations of the present invention are possible in light of the above teachings. It is therefore to be understood that within the scope of the appended claims, the invention may be practiced otherwise than as specifically described herein.

This application is based on FR 93/14792, filed in France on Dec. 9, 1993, the entire contents of which are hereby incorporated by reference.

What is claimed as new and desired to be secured by Letters Patent of the United States is:

1. Glass strands produced by the process in which a plurality of threads of molten glass flowing from a plurality of holes disposed at the base of one or more dies is drawn to form one or more fans of continuous filaments, said filaments then being assembled into one or more strands which are collected on a moving support, wherein a heat-polymerizable sizing composition is deposited on a surface of said filaments during drawing and before said filaments are assembled into strands, said sizing composition being constituted by a solution with a solvent content of less than 5% by weight and a viscosity less than or equal to 400 cP, said solution comprising a basic structure which can be polymerized and/or cross-linked thermally, said basic structure comprising at least 60% by weight of the basic structure of one or more components with molecular weights (Mw) of less than 750 having at least one of an acrylic, a methacrylic, a vinyl ether, an N-vinylamide, and an N-vinyllactam function, the proportion of polyfunctional component(s) within said components being at least 45% by weight of said components, so as to produce glass strands coated with a non-polymerized, heat-polymerizable sizing composition, wherein said filaments are coated uniformly with non-polymerized sizing composition.

2. Glass strands produced by the process in which a plurality of threads of molten glass flowing from a plurality of holes disposed at the base of one or more dies is drawn to form one or more fans of continuous filaments, said filaments then being assembled into one or more strands which are collected on a moving support, wherein a heat-polymerizable sizing composition is deposited on a surface of said filaments during drawing and before said filaments are assembled into strands, said sizing composition being constituted by a solution with a solvent content of less than 5% by weight and a viscosity less than or equal to 400 cP, said solution comprising a basic structure which can be polymerized and/or cross-linked thermally, said basic structure comprising at least 60% by weight of the basic structure of one or more components with molecular weights (Mw) of less than 750 having at least one of an acrylic, a methacrylic, a vinyl ether, an N-vinylamide, and an N-vinyllactam function, the proportion of polyfunctional component(s) within said components being at least 45% by weight of said components, so as to produce glass strands coated with a non-polymerized, heat-polymerizable sizing composition, further comprising heating said strands produced after said collection step so as to bring about polymerization of said sizing composition, wherein said filaments are uniformly coated with polymerized sizing composition.

3. Glass strands according to claim 2, wherein the ignition loss is less than 5%.

4. A composite comprising an organic substrate reinforced by glass strands wherein it comprises glass strands as defined in claim 2.

5. A composite produced by contacting sized strands with an organic substrate to be reinforced, to form an assembly, and heating said assembly sufficient to polymerize or gel said assembly and to produce a composite, wherein it is formed from sized glass strands produced by the process in which a plurality of threads of molten glass flowing from a plurality of holes disposed at the base of one or more dies is drawn to form one or more fans of continuous filaments, said filaments then being assembled into one or more strands which are collected on a moving support, wherein a heat-polymerizable sizing composition is deposited on a surface of said filaments during drawing and before said filaments are assembled into strands, said sizing composition being constituted by a solution with a solvent content of less than 5% by weight and a viscosity less than or equal to 400 cP, said solution comprising a basic structure which can be polymerized and/or cross-linked thermally, said basic structure comprising at least 60% by weight of the basic structure of one or more components with molecular weights (Mw) of less than 750 having at least one of an acrylic, a methacrylic, a vinyl ether, an N-vinylamide, and an N-vinyllactam function, the proportion of polyfunctional component(s) within said components being at least 45% by weight of said components, so as to produce glass strands coated with a non-polymerized, heat-polymerizable sizing composition, wherein said filaments are coated uniformly with non-polymerized sizing composition.

6. Glass strands produced by the process in which a plurality of threads of molten glass flowing from a plurality of holes disposed at the base of one or more dies is drawn to form one or more fans of continuous filaments, said filaments then being assembled into one or more strands which are collected on a moving support, wherein a heat-polymerizable sizing composition is deposited on a surface of said filaments during drawing and before said filaments are assembled into strands, said sizing composition being constituted by a solution with a solvent content of less than 5% by weight and a viscosity less than or equal to 400 cP, said solution comprising a basic structure which can be polymerized and/or cross-linked thermally, said basic structure comprising at least 60% by weight of the basic structure of one or more components with molecular weights (Mw) of less than 750 having at least one of an acrylic, a methacrylic, a vinyl ether, an N-vinylamide, and an N-vinyllactam function, the proportion of polyfunctional component(s) within said components being at least 45% by weight of said components, so as to produce glass strands coated with a non-polymerized, heat-polymerizable sizing composition, wherein said filaments are coated uniformly with non-polymerized sizing composition, and wherein the ignition loss is less than 5%.

7. Glass strands produced by the process in which a plurality of threads of molten glass flowing from a plurality of holes disposed at the base of one or more dies is drawn to form one or more fans of continuous filaments, said filaments then being assembled into one or more strands which are collected on a moving support, wherein a heat-polymerizable sizing composition is deposited on a surface of said filaments during drawing and before said filaments are assembled into strands, said sizing composition being constituted by a solution with a solvent content of less than 5% by weight and a viscosity less than or equal to 400 cP, said solution comprising a basic structure which can be polymerized and/or cross-linked thermally, said basic structure comprising at least 60% by weight of the basic structure of one or more components with molecular weights (Mw) of less than 750 having at least one of an acrylic, a methacrylic, a vinyl ether, an N-vinylamide, and an N-vinyllactam function, the proportion of polyfunctional component(s) within said components being at least 45% by weight of said components, so as to produce glass strands coated with a non-polymerized, heat-polymerizable sizing composition, further comprising heating said strands produced after said collection step so as to bring about polymerization of said sizing composition, wherein said filaments are uniformly coated with polymerized sizing composition, and wherein the ignition loss is less than 5%.

8. Glass strands produced by the process in which a plurality of threads of molten glass flowing from a plurality of holes disposed at the base of one or more dies is drawn to form one or more fans of continuous filaments, said filaments then being assembled into one or more strands which are collected on a moving support, wherein a heat-polymerizable sizing composition is deposited on a surface of said filaments during drawing and before said filaments are assembled into strands, said sizing composition being constituted by a solution with a solvent content of less than 5% by weight and a viscosity less than or equal to 400 cP, said solution comprising a basic structure which can be polymerized and/or cross-linked thermally, said basic structure comprising at least 60% by weight of the basic structure of one or more monomeric components with molecular weights (Mw) of less than 750 having at least one of an acrylic, a methacrylic, a vinyl ether, an N-vinylamide, and an N-vinyllactam function, the proportion of polyfunctional component(s) within said components being at least 45% by weight of said components, so as to produce glass strands coated with a non-polymerized, heat-polymerizable sizing composition, wherein said filaments are coated uniformly with non-polymerized sizing composition.

9. Glass strands produced by the process in which a plurality of threads of molten glass flowing from a plurality of holes disposed at the base of one or more dies is drawn to form one or more fans of continuous filaments, said filaments then being assembled into one or more strands which are collected on a moving support, wherein a heat-polymerizable sizing composition is deposited on a surface of said filaments during drawing and before said filaments are assembled into strands, said sizing composition being constituted by a solution with a solvent content of less than 5% by weight and a viscosity less than or equal to 400 cP, said solution comprising a basic structure which can be polymerized and/or cross-linked thermally, said basic structure comprising at least 60% by weight of the basic structure of one or more monomeric components with molecular weights (Mw) of less than 750 having at least one of an acrylic, a methacrylic, a vinyl ether, an N-vinylamide, and an N-vinyllactam function, the proportion of polyfunctional component(s) within said components being at least 45% by weight of said components, so as to produce glass strands coated with a non-polymerized, heat-polymerizable sizing composition, further comprising heating said strands produced after said collection step so as to bring about polymerization of said sizing composition, wherein said filaments are uniformly coated with polymerized sizing composition.

* * * * *

UNITED STATES PATENT AND TRADEMARK OFFICE
CERTIFICATE OF CORRECTION

PATENT NO. : 5,985,447
DATED : November 16, 1999
INVENTOR(S) : Patrick MOIREAU

It is certified that error appears in the above-identified patent and that said Letters Patent is hereby corrected as shown below:

Column 8, line 6 "paratert-thiobutylcatechols," should read —paratertiobutylcatechols,—.

Column 8, line 7 "ditertthiobutylparacresols" should read —ditertiobutylparacresols—.

Signed and Sealed this

Fifth Day of June, 2001

Attest:

Attesting Officer

NICHOLAS P. GODICI

Acting Director of the United States Patent and Trademark Office